Dec. 28, 1954 H. H. CLAPP ET AL 2,698,272

METHOD OF FORMING NEEDLE-PENETRABLE STOPPERS FOR CONTAINERS

Filed Sept. 29, 1950 8 Sheets-Sheet 1

INVENTORS
RICHARD J. DENNEY
HENRY H. CLAPP
BY
Leonard L. Kalish
ATTORNEY

INVENTORS
RICHARD J. DENNEY
HENRY H. CLAPP
BY
Leonard L. Kalish
ATTORNEY

METHOD OF FORMING NEEDLE-PENETRABLE STOPPERS FOR CONTAINERS

Filed Sept. 29, 1950 8 Sheets-Sheet 3

INVENTORS
RICHARD J. DENNEY
HENRY H. CLAPP
BY Leonard L. Kalish
ATTORNEY

INVENTORS
RICHARD J. DENNEY
HENRY H. CLAPP
BY Leonard L. Kalish
ATTORNEY

INVENTORS
RICHARD J. DENNEY
HENRY H. CLAPP
BY Leonard L. Kalish
ATTORNEY

METHOD OF FORMING NEEDLE-PENETRABLE STOPPERS FOR CONTAINERS

Filed Sept. 29, 1950 8 Sheets-Sheet 6

INVENTORS
RICHARD J. DENNEY
HENRY H. CLAPP
BY [signature]
ATTORNEY

Dec. 28, 1954 H. H. CLAPP ET AL 2,698,272

METHOD OF FORMING NEEDLE-PENETRABLE STOPPERS FOR CONTAINERS

Filed Sept. 29, 1950 8 Sheets-Sheet 7

INVENTORS
RICHARD J. DENNEY
HENRY H. CLAPP
BY
Leonard L. Kalish
ATTORNEY

Dec. 28, 1954 H. H. CLAPP ET AL 2,698,272

METHOD OF FORMING NEEDLE-PENETRABLE STOPPERS FOR CONTAINERS

Filed Sept. 29, 1950 8 Sheets-Sheet 8

INVENTORS
RICHARD J. DENNEY
HENRY H. CLAPP
BY
Leonard L. Kalish
ATTORNEY 2,698,272

METHOD OF FORMING NEEDLE-PENETRABLE STOPPERS FOR CONTAINERS

Henry H. Clapp, Philadelphia, and Richard J. Denney, Drexel Hill, Pa., assignors to The Gillon Company, Inc., Philadelphia, Pa., a corporation of Pennsylvania Application September 29, 1950, Serial No. 187,446

6 Claims. (Cl. 154—110)

The present invention relates generally to needle-penetrable stoppers for the aseptic sealing of bottles, ampoules or similar containers for biological and pharmaceutical liquids, powders and the like and it relates more particularly to a novel method of forming laminated needle-puncturable self-sealing stoppers, etc.

An object of the present invention is to provide a novel method of forming a needle-penetrable sealing cap or stopper for a bottle. Another object of the present invention is to provide a new and improved method for forming a laminated needle-penetrable sealing cap or stopper for a bottle. Still another object of the present invention is to provide a novel method for securely and effectively bonding a continuous and imperforate film of chemically resistant and impervious synthetic resin to a soft-rubber sealing cap or stopper. A further object of the present invention is to provide a new and improved method for forming laminated needle-penetrable sealing caps or stoppers by effecting a firm, secure and continuous bond between a thermoplastic soft-rubber surface and a thermoplastic synthetic resin surface, employing a thermo-setting adhesive composition. A still further object of the present invention is to provide a novel method for forming a laminated needle-penetrable sealing cap or stopper by molding soft-rubber into the desired form, under the action of heat and pressure, and, simultaneously therewith, adhering to the rubber a continuous and imperforate film of thermoplastic resin, employing an intervening thermo-setting adhesive.

Other objects and advantages of the present invention are apparent in the following detailed description, appended claims and accompanying drawings.

It has been customary to package various biological and pharmaceutical liquids in bottles or ampoules or like containers and to provide such bottles, etc. with needle-pierceable stoppers or caps of soft-rubber whereby the contents can be withdrawn into a hypodermic syringe or like instrument for administration to patients. However, these conventional soft-rubber stoppers or caps have not proven entirely satisfactory because rubber interacts (chemically or otherwise) with a considerable number of pharmaceutical and biological liquids (such as are normally administered by a hypodermic syringe) with resultant contamination of the liquid contents.

In our co-pending application Serial No. 181,194, filed August 24, 1950, now abandoned, I have disclosed a novel and unique construction for such a sealing cap or stopper, namely a laminated structure in which a relatively thin, flexible, imperforate, chemically-resistant and impervious film of nylon or other suitable thermoplastic synthetic resin is firmly and continuously adhered to at least the underside (and, optionally, also the upper side) of a soft-rubber body; the synthetic resin film and the soft-rubber body being effectively bonded (by an intervening layer of adhesive material) into a more or less unitary structure having the desired resilience and compressibility of the rubber and the chemical inertness and the smooth relatively non-porous surface of the synthetic resin.

The present application is directed to our novel method of forming the laminated sealing cap or stopper of my aforesaid co-pending application.

Generally speaking, the novel method of the present invention includes the steps of placing a relatively thin film of nylon or other suitable thermoplastic synthetic resin next to a body of soft rubber (natural or synthetic) (said body of rubber either being in the form of a continuous sheet or being in the form of pellets or other discrete particles which will fuse together when heated) with a coating (either continuous or discontinuous) of thermosetting adhesive on the juxtaposed face of the nylon film (or, optionally, on the juxtaposed face of the rubber sheet) and then subjecting the juxtaposed nylon and rubber to the action of heat and pressure so as to mold the soft rubber into the desired form with the film forming a continuous and imperforate covering or "skin" on one side of the molded stopper and simultaneously to harden or "set" the adhesive so as to create a firm and continuous bond between the outer skin or film and the molded soft rubber.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1:
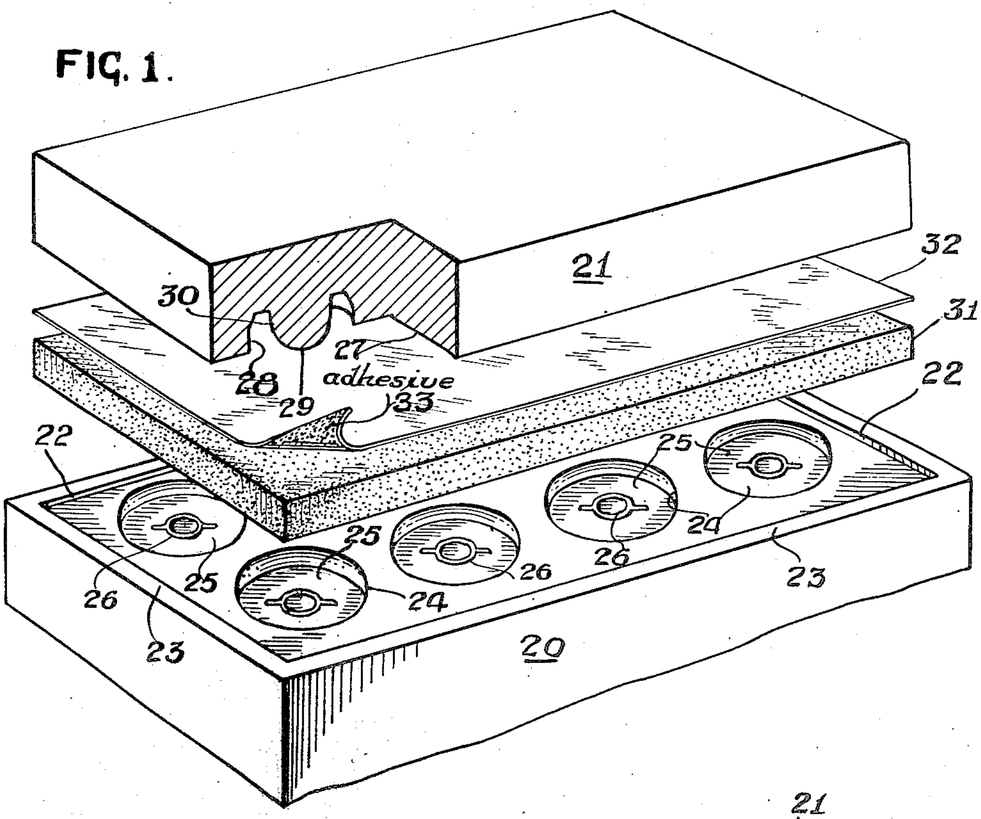
Figure 1 represents a more or less schematic fragmentary perspective view showing a soft-rubber sheet and an adhesive-coated nylon film as they appear prior to being brought together intermediate the sections of a heated pressure-mold; parts being broken away better to reveal the construction thereof.

In Figure 1 there is shown, schematically, a heated pressure-mold made up of a lower stationary section 20 and an upper downwardly-movable section 21; the sections 20 and 21 being provided with conventional concealed electrical heating elements (not shown) whereby the sections can be maintained at any desired elevated temperature.

The upper face of the lower mold-section 20 is recessed slightly as at 22 in respect to a peripheral shoulder 23. The recessed portion 22 is provided with a plurality of spaced generally cylindrical sockets or concavities 24; the bottom generally flat and circular wall 25 of each socket 24 being grooved as at 26 to provide a marker on the final stopper, as will be described hereinbelow.

The lower face 27 of the upper movable mold-section 21 is provided with a plurality of annular depressions 28 disposed in vertical alignment with the sockets 24 described above; a downwardly-extending convex semi-spherical knob 29 being formed in the center of each annular depression 28. An upwardly-tapered annular surface 30 is formed at the upper end of each annular depression 28.

A flat sheet 31 of heat-moldable relatively soft and resilient elastomer, i. e., rubber, is adapted to be positioned above the upper face 22 of the lower mold-section 20.

A relatively thin flexible imperforate chemically-resistant and non-porous film 32 of nylon or other suitable thermoplastic synthetic resin is adapted to be positioned above the rubber sheet 31 with its lower face coated, as at 33, with a layer of thermo-setting adhesive capable of bonding the nylon film to the rubber sheet under the action of heat and pressure.

A thermo-setting adhesive composition which can be employed for this purpose may be formed as follows.

6.3 parts (by weight) of 28% ammonium hydroxide is added to 28 parts of 62.5% crude latex, with stirring, after which the mixture is added (with stirring) to 46.4 parts of a resorcinol-formaldehyde reaction composition, which, for the purposes of nomenclature, may be designated as the "sub-batch." To the so resultant mixture is slowly added 2.9 parts of a 37% aqueous solution of additional formaldehyde, with continued stirring. During addition of this formaldehyde, sufficient dilute (for example 10% strength) sodium hydroxide solution is added from time to time to maintain the pH of the mixture at approximately 10.5.

One embodiment of the aforementioned "sub-batch" can be prepared as follows:

1.6 parts (by weight) of resorcinol, 1.4 parts of a 37% solution of formaldehyde and 0.4 part of 10% sodium hydroxide solution are added to 11 parts of hot water and the mixture is permitted to react, with stirring, for about 30 minutes at a temperature of approximately 130–150° F. At the end of this time, 8.8 parts of ice water (i. e. water at a temperature at or slightly above its freezing point) is added to the mixture to reduce its temperature and to stop the reaction, after which the material is ready for use.

The adhesive-coated side 33 of the nylon (or other thermoplastic synthetic resin) film 32 is brought into contact with the upper surface of the rubber sheet 31, whereupon the upper movable mold-section 21 is brought down under pressure (employing any conventional pressure-mold mechanism) until its lower face 27 makes surface contact with the shoulder 23 of the upper face of the lower mold-section 20.

The thickness of the sheet 31 is somewhat greater than the depth of the recessed portion 22 so that when the mold-sections are closed, the heat-softened rubber is forced, by the pressure of the mold, into the sockets 24 and also into the annular depressions 28, so as completely to fill the sockets and depressions.

Figure 2:
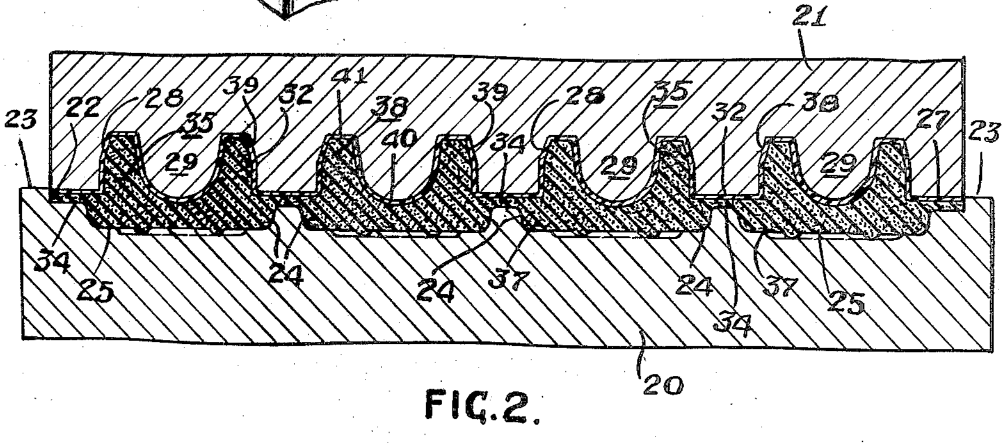
Figure 2 represents a vertical cross-sectional view, on an enlarged scale, showing the appearance of the rubber sheet and nylon film when the heated mold-sections have been brought together.

The nylon (or other thermoplastic synthetic resin) film 32 is also softened by the heat of the mold and is forced into the annular depressions 28 by the mold-pressure to assume the configuration shown in Figure 2.

The nylon (or other thermoplastic synthetic resin) preferably has a somewhat higher softening point than the rubber so that, at the predetermined mold temperature (approximately 385° to 320° F.) the nylon does not become as fluid or plastic as the rubber. That is, the rubber should become sufficiently plastic to lose its form-retaining property and to permit it to be displaced into the sockets 24 and annular depressions 28. The nylon film 32, on the other hand, should be softened only sufficiently to permit it to be shaped to the configuration of the annular depressions 28 and knobs 29 while still retaining its cohesive property as a continuous imperforate film of generally uniform thickness.

Under the action of the heat and pressure of the mold, the thermoplastic adhesive coating 33 hardens or "sets" so as to adhere to both the nylon and the rubber surfaces and thereby to create a continuous connection therebetween and thereby to give a securely bonded laminated structure.

In other words, the hardening or setting of the adhesive takes place generally simultaneously with the molding of the rubber and nylon sheets.

Figure 3:
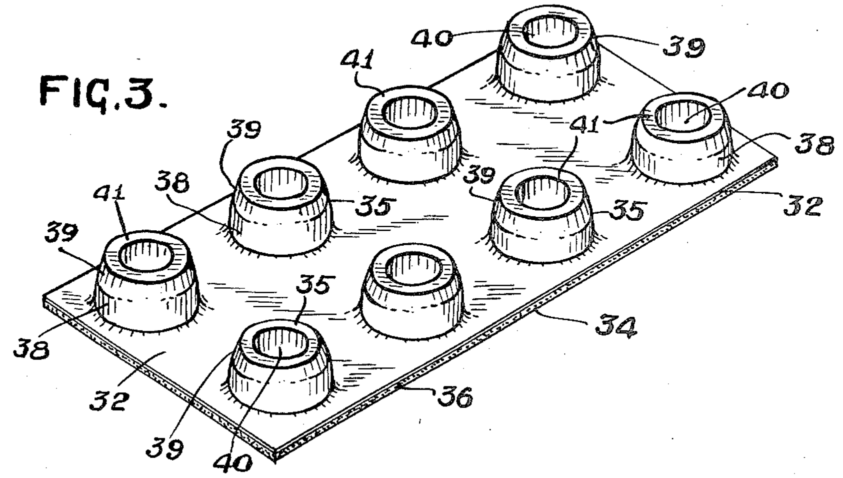
Figure 3 represents a fragmentary perspective view showing the film-covered side of the composite laminated structure after it has been removed from the mold.
Figure 4:
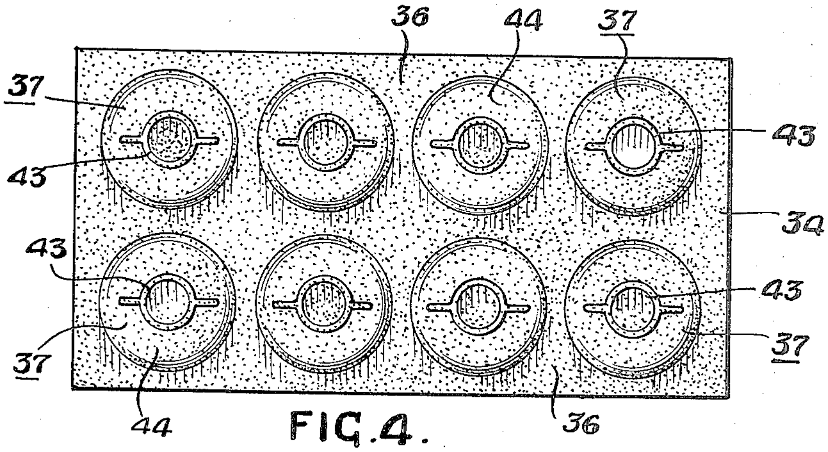
Figure 4 represents a plan view showing the uncoated side of the strip of Figure 3.

The mold is then opened and the composite two-ply laminated strip 34 shown in Figures 3 and 4 is removed therefrom.

The strip 34 is made up of a plurality of stopper-portions 35 connected by relatively thin webbing or flashing 36; one side of the strip 34 being covered by the continuous nylon film 32 which has now been shaped into the configuration of the lower face 27, annular depressions 28 and knobs 29 of the upper mold-section 21, as described above.

The thickness of the nylon-coated webbing 36 corresponds generally to the depth of the recess 22 and is appreciably less than the original thickness of the rubber sheet 31. The other side of the strip 34, shown in Figure 4, is uncoated.

Each stopper-portion 35 includes an enlarged disc-shaped portion 37 disposed on the uncoated side of the strip 34 and protruding downward slightly therefrom; the portion 37 having been formed by the sockets 24. Each stopper-portion also includes a generally cylindrical portion 38, of smaller diameter than the portion 37 and extending upwardly on the coated side of the strip 34. An upwardly-tapered annular surface 39 is formed at the upper end of the portion 38 and a semi-spherical concave surface 40 extends downwardly from the top of the portion 38; an annular rim 41 separating the surfaces 39 and 40.

As can be seen particularly in Figure 2, the configuration of the portion 38 and the surfaces 39, 40 and 41 are formed by the annular depression 28, the tapered surface 30 and the knob 29 of the upper mold-section 21.

As the final step in the forming process, each individual stopper-portion 35 is severed from the strip 34 by cutting the webbing along the outer periphery of the disc-shaped portion 37. Any conventional cutting or stamping mechanism (not shown) can be employed for this purpose, such as for example a stamping press having multiple annular cutting dies (adapted to fit snugly over the peripheries of the cylindrical portions 38) of the type which is commercially available and known in the art.

Figure 5:
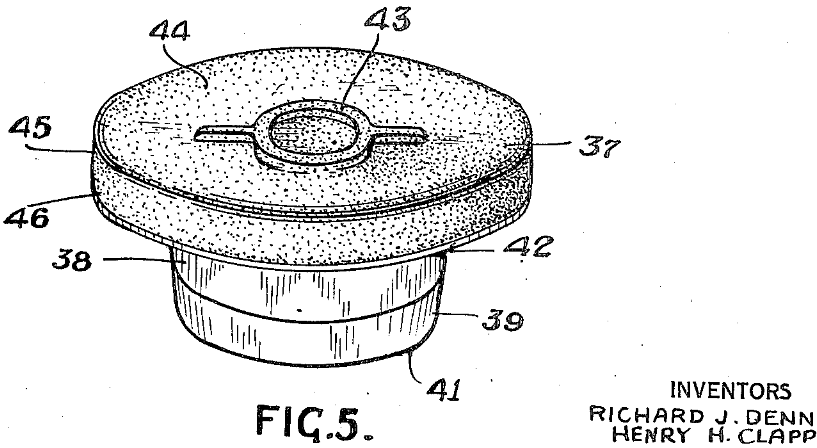
Figure 5 represents a perspective view of an individual stopper as it appears after it has been detached from the strip of Figures 3 and 4.

After being thus severed, the stopper portions form individual stoppers, as shown in Figure 5, wherein the disc-shaped portion 37 constitutes the top with its lower annular surface forming a downwardly directed nylon-coated annular flange 42 (constructed and arranged to make fluid-tight peripheral contact with the rim or lip of a bottle or like container, as shown and described in our aforesaid co-pending application Serial No. 181,194) and wherein the cylindrical portion now forms the nylon-coated body (constructed and arranged to make fluid-tight contact with the neck of the bottle) and wherein the nylon-coated semi-spherical concave surface 40 serves to reduce the thickness of rubber at the center of the stopper so as to facilitate penetration by a hypodermic needle (as shown and described in our co-pending application Serial No. 181,194) and wherein a central raised marker 43 is formed upon the flat upper circular surface 44 of the top 37; the marker 43 having been formed by the marker-grooves 26 described above.

The upper portion 45 of the generally cylindrical peripheral surface of the top 37 is a molded surface (formed by the sides of the sockets 24 as described above) while the lower portion 46 is a cut surface (corresponding to the line of peripheral cut severing the individual stopper-portions 35 from the webbing 36).

The stopper 35 of Figure 5 is used by inserting its nylon-covered body-portion 38 within the neck of the bottle, in snugly-fitting slightly-compressed fluid-tight relationship therewith until its nylon-covered flanged surface 42 makes peripheral fluid-tight contact with the rim or lip of the bottle in a manner shown, and more fully described, in our aforesaid co-pending application Serial No. 181,194. A sheet-metal retaining-cap (not shown) or other suitable means can be used to hold the stopper securely in place in the mouth of the bottle with a removable center portion adapted to expose the marker 43 preliminary to use.

The stopper 35 is constructed and arranged to be readily pierced or punctured by the needle of a hypodermic syringe or the like, the point of which is positioned inside the marker 43 and manually forced through the stopper at the centermost thinnest portion thereof and also penetrating the nylon (or other synthetic resin) film 32 generally at the center of the semi-spherical surface 40.

The secure bond between the flexible nylon film and the resilient soft rubber of the stopper insures against detachment of any small particle of the nylon during penetration of the needle (such as would introduce foreign particles into the liquid contents of the bottle which might be inadvertently injected into a patient, with serious results) and also results in substantially re-sealing of the nylon (or other synthetic resin) film when the needle is withdrawn. In this way, the film remains substantially to protect the soft rubber from being attacked by the liquid contents of the bottle (such as would result in contamination of the liquid contents) and permits the contents to be withdrawn, in fractional amounts, from time to time.

The adhesive composition (for example that described hereinabove) may be applied to the surface of the nylon (or other synthetic resin) film in liquid or semi-liquid form by using any conventional roller-coating or knife-coating or brush-coating apparatus. Instead, the adhesive composition can be sprayed onto the surface of the nylon film, using any conventional spray-gun.

The nylon (or other synthetic resin) film with the adhesive so applied thereto is then dried in any suitable oven or heating compartment (at a temperature sufficiently low to prevent softening of the nylon film or setting of the adhesive) to leave a thin relatively dry and non-tacky coating of the adhesive upon the surface of the film.

This preliminary drying of the adhesive coating may be executed by radiant heating elements or by convection-heating or by a combination of the two.

The coating and drying of the nylon (or other synthetic resin) film can be carried out as a continuous operation; an elongated strip of the film, in roll form, being passed over one or more coating rollers (which apply the adhesive to one side thereof) and by then passing the coated strip through an elongated heating chamber or tunnel, with the strip suitably supported from the uncoated side, in the form of a more or less straight strip or in festooned form (i. e. looped over elevated supporting arms at spaced intervals).

Figures 6, 7:
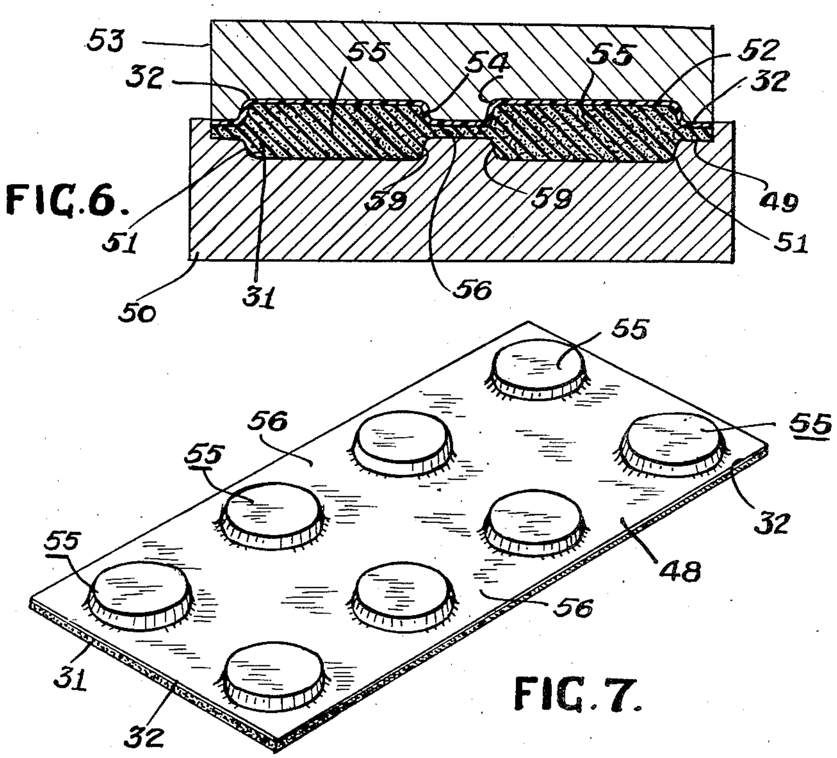
Figure 6 represents a cross-sectional view generally like that of Figure 2, but showing another embodiment.
Figure 7 represents a perspective view like that of Figure 3 but showing the embodiment of Figure 6.
Figure 8:
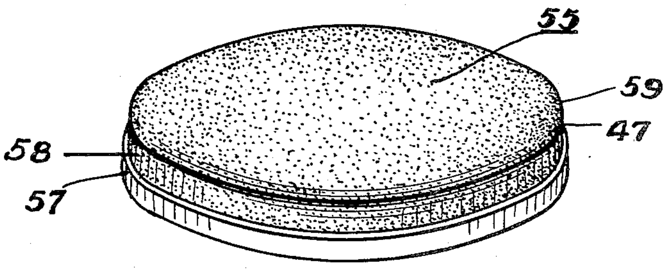
Figure 8 represents a perspective view of an individual stopper as it appears when detached from the strip of Figure 7.

In Figure 8 there is shown another sealing cap or stopper 47; intermediate stages in the formation of which are shown in Figures 6 and 7. Thus, the strip 48 shown in Figure 7 is formed by positioning an adhesive-coated nylon film 32 above a sheet 31 of resilient soft rubber or the like in the manner described hereinabove but employing a different mold wherein the recessed upper face 49 of the stationary lower mold-section 50 is provided with generally cylindrical sockets or concavities 51 and wherein the lower recessed face 52 of the movable upper mold-section 53 is provided with matching cylindrical sockets or concavities 54.

When the upper mold-section 53 is brought down to make peripheral contact with the lower mold-section, the heat and pressure soften the rubber sheet 31 and cause some of the rubber to flow into the mold sockets 51 and 54 in a manner similar to that described hereinabove. The uppermost nylon film is also softened (though to a somewhat lesser extent) so that it conforms to the configuration of the lower face 52 of the upper mold-section 53 as indicated in Figure 6.

The heat and pressure of the molding operation also cause the thermo-setting adhesive to harden or "set" so as to provide a firm and continuous bond intermediate the nylon and rubber surfaces, and thereby to form a laminated two-ply structure.

After cooling, the mold is opened and the strip 48 is removed. The strip 48 includes a plurality of stopper-portions 55 which are more or less cylindrical in configuration and which extend above and below connecting webbing 56.

One side of the strip 48 is continuously covered by the imperforate nylon (or other synthetic resin) film 32 as shown particularly in Figure 7. The other side (not shown) generally resembles the side shown in Figure 7 except that it does not have any nylon (or other synthetic resin) film thereon.

Individual stoppers, like that shown in Figure 8, are formed from the strip 48 by cutting around the periphery of the cylindrical stopper-portions 55 in any suitable manner, as for example by employing a conventional multiple stamping machine having a plurality of individual annular stamping dies adapted to fit snugly over the disc-shaped stopper-portions 55.

The nylon film 32 covers all of one of the flat circular walls of the final stopper 55 and, as can be seen particularly in Figure 8, also extends axially part way along the cylindrical wall, as at 57. A center annular portion 58 of the cylindrical wall of the stopper 55 is a cut surface (corresponding to the peripheral line of cut whereby the stopper-portions are severed from the webbing). The other end 59 of the cylindrical wall of the stopper 55 is a molded but uncoated surface (as formed by the sockets or concavities 51 in the lower mold-section 50 described above).

As shown and more fully described in our aforesaid co-pending application Serial No. 181,194, the stopper 55 of Figure 8 is adapted to be used with the coated flat circular side underneath and making peripheral contact with the lip or rim of the bottle or other container; suitable fastening means, as for example a sheet-metal retaining-cap (not shown) being employed to clamp the stopper firmly upon the rim or lip of the bottle, etc. and to maintain it in somewhat-compressed fluid-tight sealing relationship therewith.

The stopper 55 is adapted to be penetrated by the needle of a hypodermic syringe; the point of the needle being forced manually downward through the soft rubber of the stopper and the nylon (or other synthetic resin) film to below the level of the liquid contents of the bottle. After withdrawal of part of the contents of the bottle into the hypodermic syringe, in conventional manner, the needle is withdrawn whereupon the nylon (or other synthetic resin) film 32 in effect re-seals itself so as again to present a substantially continuous nylon surface which protects the soft rubber from being acted upon by the liquid contents of the bottle. That is, the combination of the resilience of the rubber, the flexibility of the nylon film and the secure bonding action of the intervening heat-set adhesive prevents separation of small particles of the nylon film during passage of the needle therethrough and insures virtual re-sealing of the small hole or puncture made in the nylon film by the needle.

Figure 11:
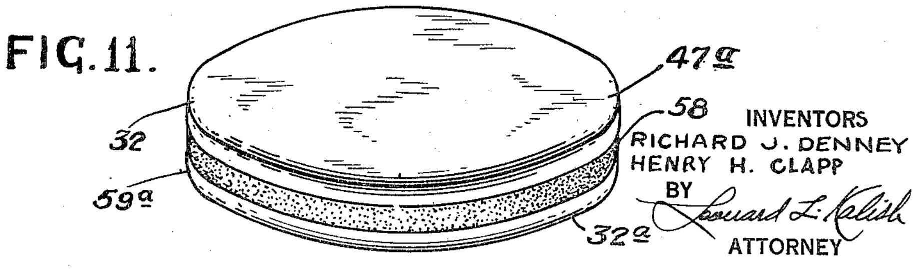
Figure 11 represents a perspective view of an individual stopper as it appears when detached from the strip of Figure 10.

In Figure 11 there is shown a modified form of stopper 47–*a* which generally resembles the stopper shown in Figure 8 except that both of the flat circular sides of the generally cylindrical stopper are covered by thin films of nylon (or other synthetic resin).

Figure 9:
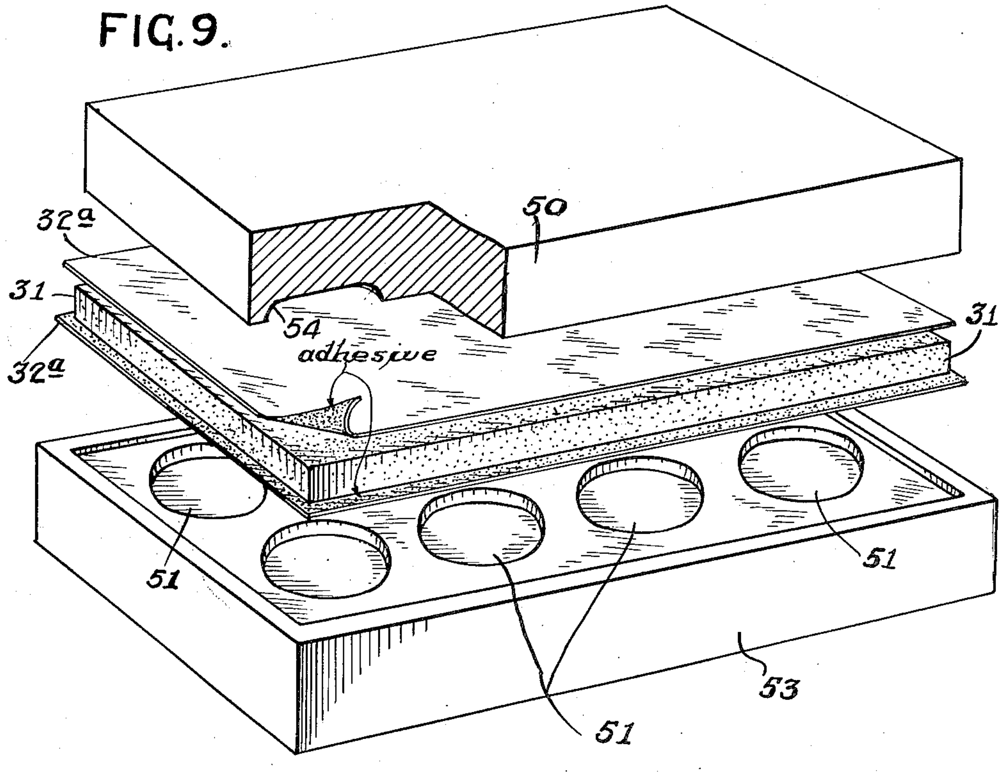
Figure 9 represents a more or less schematic perspective view generally like that of Figure 1 but showing another embodiment of the present invention wherein separate thin films of nylon or the like are positioned on either side of the rubber sheet.

As indicated in Figure 9, the stopper of Figure 11 is formed by positioning adhesive-coated nylon (or other thermoplastic synthetic resin) films 32 and 32–*a* above and below the soft rubber sheet 31.

Figure 10:
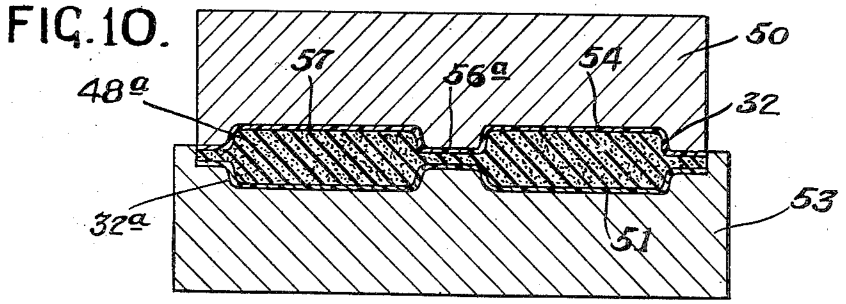
Figure 10 represents a cross-sectional view like that of Figure 2 but showing the embodiment of Figure 9.

The mold-sections 50 and 53 (identical with those described hereinabove) are then brought together to force the softened rubber and the nylon films into the configuration of the mold-cavities and thereby to form a strip 48–*a* shown particularly in Figure 10 and generally resembling the strip 48 described above except for the addition of the second nylon (or other thermo-setting synthetic resin) film 32–a on the opposite side of the strip.

The individual stoppers 47–a are detached from the strip 48–a by forming a continuous cut around the periphery of each of the stopper-portions, thereby severing the stopper-portions from the intervening double-coated webbing 56–a.

The final stopper 47–a shown in Figure 11 is identical with the stopper 47 except that, as mentioned above, the second nylon film 32–a covers the other flat circular side and extends over the adjoining portion of the cylindrical wall, as at 59–a. In other words, the coated surface 59–a replaces the uncoated molded surface 59 of the embodiment of Figure 11 so that the two coated cylindrical surfaces 57 and 59–a of this embodiment are separated by the central cut surface 58.

The method of use of the stopper of Figure 11 is generally the same as that of Figure 8 except that, as more fully described in our co-pending application Serial No. 181,194, the upper nylon (or other synthetic resin) film 32–a tends to protect the soft rubber from the action of any external corrosive chemicals and also to prevent the soft rubber from being deteriorated by the action of the outside atmosphere and, additionally, presents a smooth and impervious surface which can more readily be cleaned and sterilized prior to penetration of the hypodermic needle. Just as with the lower film 32, the upper film 32–a is securely bonded to the soft rubber (to form a generally three-ply structure) so that there is no separation during passage of the needle and so that the film effectively re-seals itself after the needle is withdrawn.

Figures 12, 13:
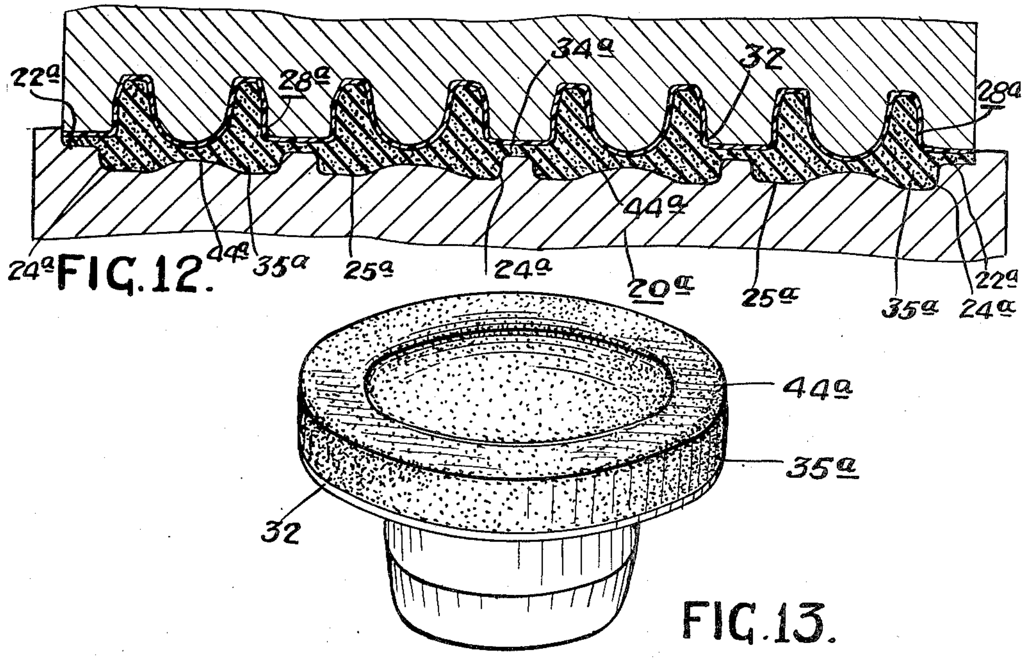
Figure 12 represents a cross-sectional view generally like that of Figure 2 but showing an intermediate stage in the process for forming a modified form of laminated stopper.
Figure 13 represents a perspective view of an individual stopper formed from the strip of Figure 12.

In Figure 13 there is shown a stopper 35–a which generally resembles the stopper 35 of Figure 5 except that its upper surface 44–a, instead of being flat, is somewhat dished or concave to reduce the thickness of rubber through which the hypodermic needle must pass in penetrating the stopper.

In Figure 12 there is shown an intermediate stage in the method of forming the stopper 35–a.

Thus, the method of formation of this stopper is exactly the same as that described hereinabove in connection with Figures 1–5 except that, as shown in Figure 12, the bottom walls 25–a of the sockets 24–a in the recessed upper face 22–a of the lower mold-section 20–a are somewhat convex (instead of being flat) so as to form the corresponding dished surfaces 44–a in the stopper-portions 35–a of the strip 34–a.

The individual stoppers 35–a are cut from the strip 34–a in the same manner as described hereinabove in connection with the strip 34 to give the final construction shown in Figure 13.

As shown and more fully described in our co-pending application Serial No. 181,194, the point of the hypodermic needle is positioned at the centermost lowest portion of the dished surface 44–a and is then manually forced downward to penetrate the soft rubber and the nylon film 32.

As can be seen by comparing Figure 12 to Figure 2, the thickness of rubber through which the needle must pass in penetrating the stopper is appreciably less in this dished form of stopper so as to make penetration easier and to lessen the danger of damage to the needle.

Figure 15:
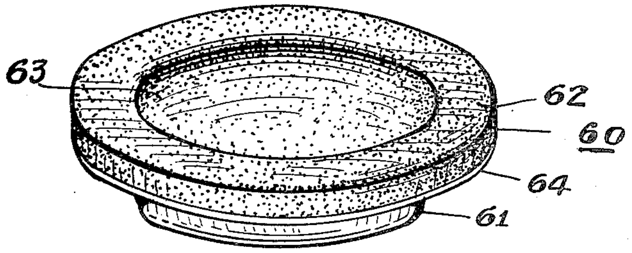
Figure 15 represents a perspective view of an individual stopper of Figure 14.

In Figure 15 there is shown a stopper 16 which includes a relatively short cylindrical body-portion 61 and an enlarged top-portion 62, the upper surface of which is dished as at 63 to reduce the thickness of rubber through which the hypodermic needle must pass in penetrating the needle. A continuous and imperforate film 64 of nylon (or other thermoplastic synthetic resin) is securely bonded to the body-portion and to the downwardly-directed annular flange 65 of the top-portion 62 by an intervening layer of thermosetting adhesive in the manner described hereinabove.

Figure 14:
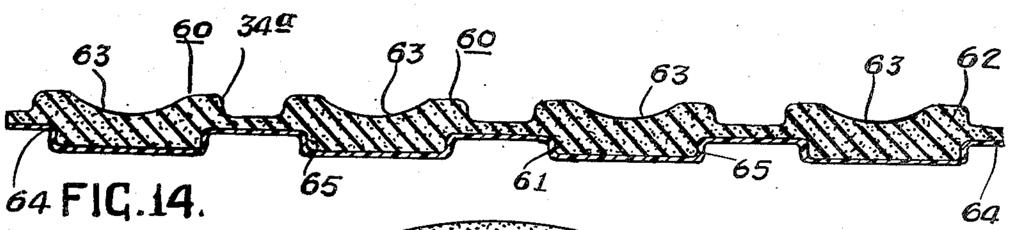
Figure 14 represents a cross-sectional view of a strip of stoppers of another embodiment of the invention.

In Figure 14 there is shown an intermediate stage in the method of forming the stopper 60 of Figure 15.

The method of formation of this stopper is the same as that described hereinabove in connection with Figures 1–5 except that the bottom walls 25–a of the sockets 24–a in the recessed upper face 22–a of the lower mold-section 20–a are somewhat convex as described above in connection with Figure 12 while the depressions 28–a are cylindrical in form.

Figure 16:
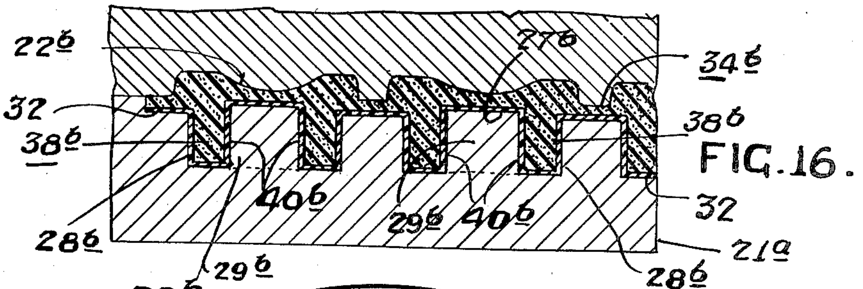
Figure 16 represents a cross-sectional view generally like that of Figure 2, but showing another embodiment of the invention.

The individual stoppers 60 are cut from the strip 66 of Figure 16, using any conventional stamping die mechanism to trim away the webbing or flashing 67 around the periphery of the top portion of each stopper.

Figures 17, 18, 19:
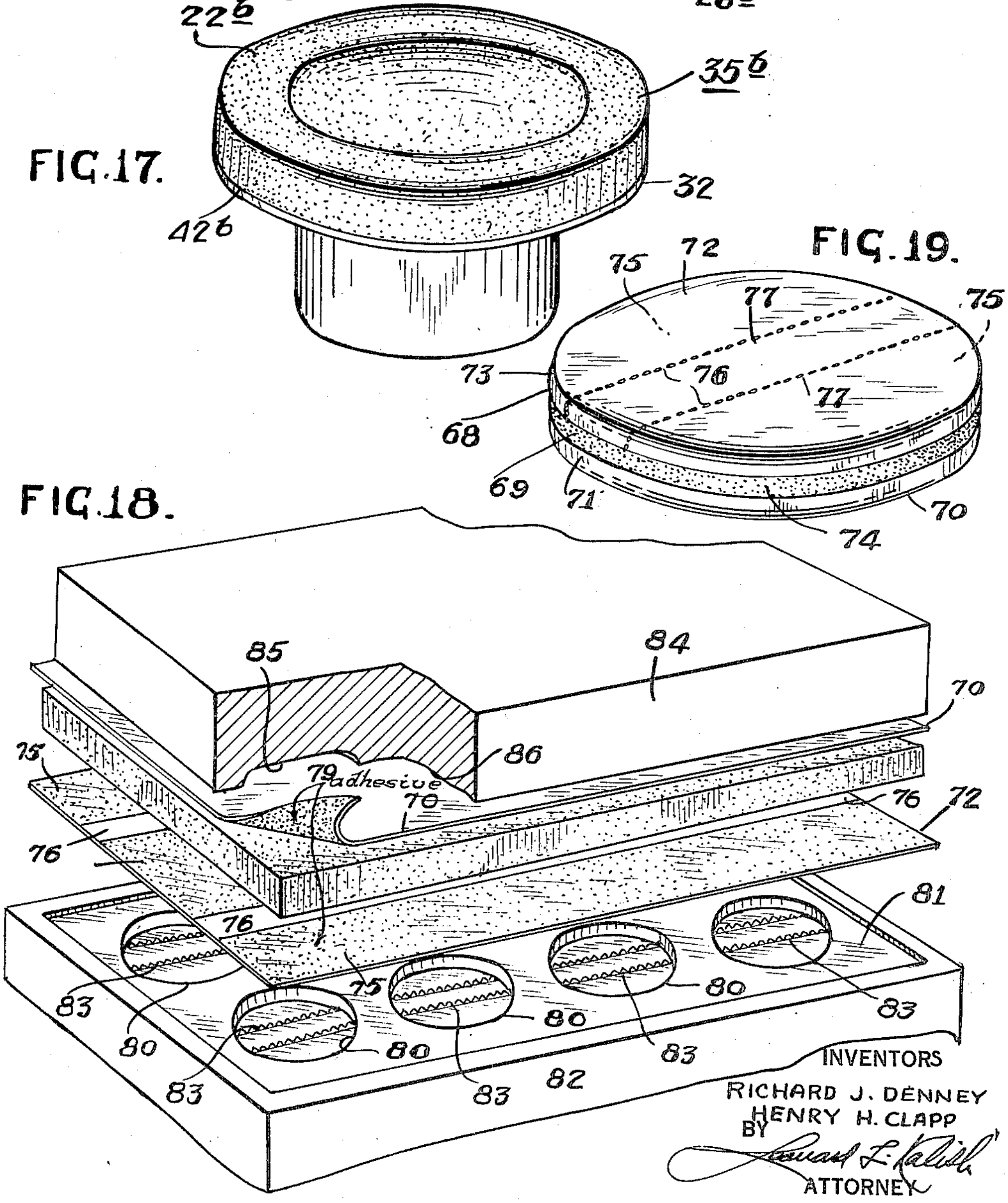
Figure 17 represents a perspective view of an individual stopper of Figure 16.
Figure 18 represents a more or less schematic fragmentary perspective view generally similar to Figure 1, but showing another embodiment of the invention.
Figure 19 represents a perspective view of an individual stopper of the embodiment shown in Figure 18.

In Figure 17 there is shown a stopper 35–b which generally resembles the stopper 35 of Figure 5 except that the upper face 22–b of the top portion is dished (as in the stopper of Figure 12 described above) and except that the body-portion 38–b is provided with a generally cylindrical concavity 40–b.

The continuous nylon film 32 covers the cylindrical inner and outer surfaces of the body-portion 38–b and also the downwardly-directed annular flange 42–b of the top portion 37–b and is securely bonded thereto by an intervening layer of thermosetting adhesive in the manner described above.

In Figure 16 there is shown a strip 34–b which represents an intermediate stage in the method of formation of the stopper 35–b of Figure 17.

The strip 34–b is formed by positioning a rubber sheet and a nylon film intermediate the halves of a heated pressure mold in a manner similar to that described hereinabove except that, in this case, the knobs or tips 29–b in the annular depressions 28–b formed in the lower face 27–b of the upper movable mold-section 21–b are cylindrical rather than semi-spherical.

In Figure 19 there is shown a stopper 68 which generally resembles the stopper 47–a of Figure 11 in that it is formed by a generally cylindrical body-portion 69 of rubber having a continuous film 70 securely bonded to the flat circular sides of the rubber and extending part way along the cylindrical wall as at 71. A second nylon film 72 similarly covers the other flat circular wall of the rubber and extends part way along the cylindrical wall as at 73; the cylindrical wall having an uncoated cut intermediate portion 74 formed thereon.

However, the film 72, instead of being continuously bonded to the rubber as is the film 70, is bonded thereto only along spaced segment-shaped areas 75; there being an unbonded area 76 extending diametrically across the film 72 and down along the portion 73 thereof.

Weakening lines 77 (of perforations) are formed along the sides of the unbonded area 76 so that the nylon film can be grasped and manually torn away to expose a clean and sterile rubber surface for insertion of the hypodermic needle.

A preliminary stage in the method of formation of the stopper 68 is shown in Figure 18. Thus, in Figure 18 a rubber strip is shown schematically as positioned intermediate the nylon films 70 and 72; the film 70 being uppermost and the film 72 lowermost at this stage. The under surface of the film 70 is continuously coated with a layer 79 of dried thermosetting adhesive.

The upper surface of the film 72 is coated with dried thermosetting adhesive only along portions 77 thereof; uncoated areas 76 extending longitudinally along the film 72 in alignment with generally cylindrical mold-cavities 80 formed in the recessed upper face 81 of the lower mold-section 82; the cavities 80 being provided with rows of small spaced projections 83 which form the weakening lines 77 in the final stopper 68.

The upper mold-section 84 has cylindrical mold-cavities 85 formed in its recessed lower face 86 in line with the mold-cavities 80 and generally identical therewith except that the projections are omitted.

When the mold sections 82 and 84 are brought together, the rubber and the nylon films are forced into the form of the mold-cavities under the action of the heat and pressure. At the same time, bonding occurs between the nylon and the rubber in those areas of the nylon films which were coated with the thermosetting adhesive. However, along the uncoated area 76 of the nylon film 72, no bonding action takes place; the nylon simply fitting snugly over the rubber in this area so as to keep the rubber surface clean and sterile and, at the same time, to permit the portion of the film intervening the weakening lines 77 to be readily torn away preliminary to insertion of the hypodermic needle.

Figures 20, 21, 22, 23:
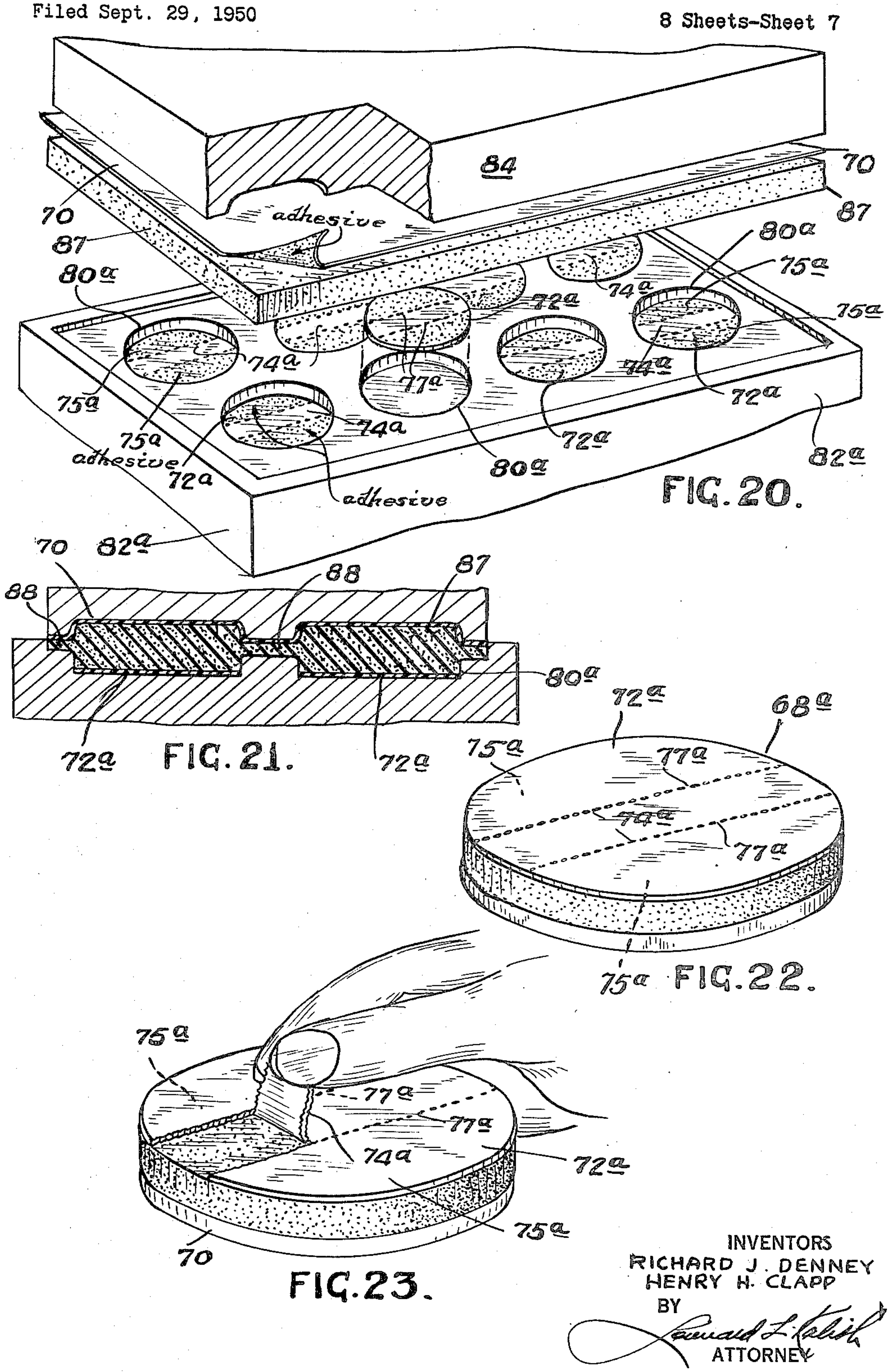
Figure 20 represents a more or less schematic fragmentary perspective view generally like Figure 1, but showing another embodiment of the invention.
Figure 21 represents a cross-sectional view generally like Figure 2, but showing the embodiment of the invention of Figure 20.
Figure 22 represents a perspective view of an individual stopper as it appears when detached from the strip of Figure 21.
Figure 23 represents a perspective view of the stopper of Figures 20, 21 and 22, showing the use of a portion thereof.

In Figure 22 there is shown a modified form of stopper 68–a which generally resembles the stopper 68 except that the nylon film 72–a is co-extensive with the flat circular wall of the body-portion and does not extend along the cylindrical wall thereof.

In Figures 20 and 21 there are shown intermediate stages in the method of formation of the stopper 68–a.

According to this embodiment, the continuous nylon film 72 is replaced by a plurality of separate individual discs 72–a of nylon (or other thermoplastic synthetic resin) each of which is adhesive-coated only along segment-shaped areas 75–a, with a diametrically-extending uncoated area 74–a therebetween and with weakening lines 77–a already formed thereon (as for example by providing perforating teeth in the punching dies which stamp the discs out from a large film of nylon).

The individual nylon discs 72–a are positioned within the mold cavities 80–a in the lower mold-section 82–a (the mold cavities 80–a being identical with the mold cavities 80 except that the projections 83 are omitted therefrom), after which the upper mold section 84 is brought down to form the rubber and nylon into the desired configuration and to cause continuous bonding of the nylon film 70 to one side of the rubber strip 87 and partial bonding of the nylon discs 72–a to the opposite side of the rubber strip, at the stopper-portions 68–a thereof.

After the mold is open, the strip 87, shown in Figure 21, is removed therefrom, after which the stopper-portions 68–a are cut from the strip by trimming off the webbing or flashing 88 (which, in this embodiment, is nylon-coated only along one surface thereof) in a manner similar to that described hereinabove.

The unbonded center area 74–a of the nylon film 72–a can be grasped and manually torn away along the weakening lines 77–a so as to expose a clean and sterile rubber surface for penetration by the hypodermic needle.

Figures 25, 26:
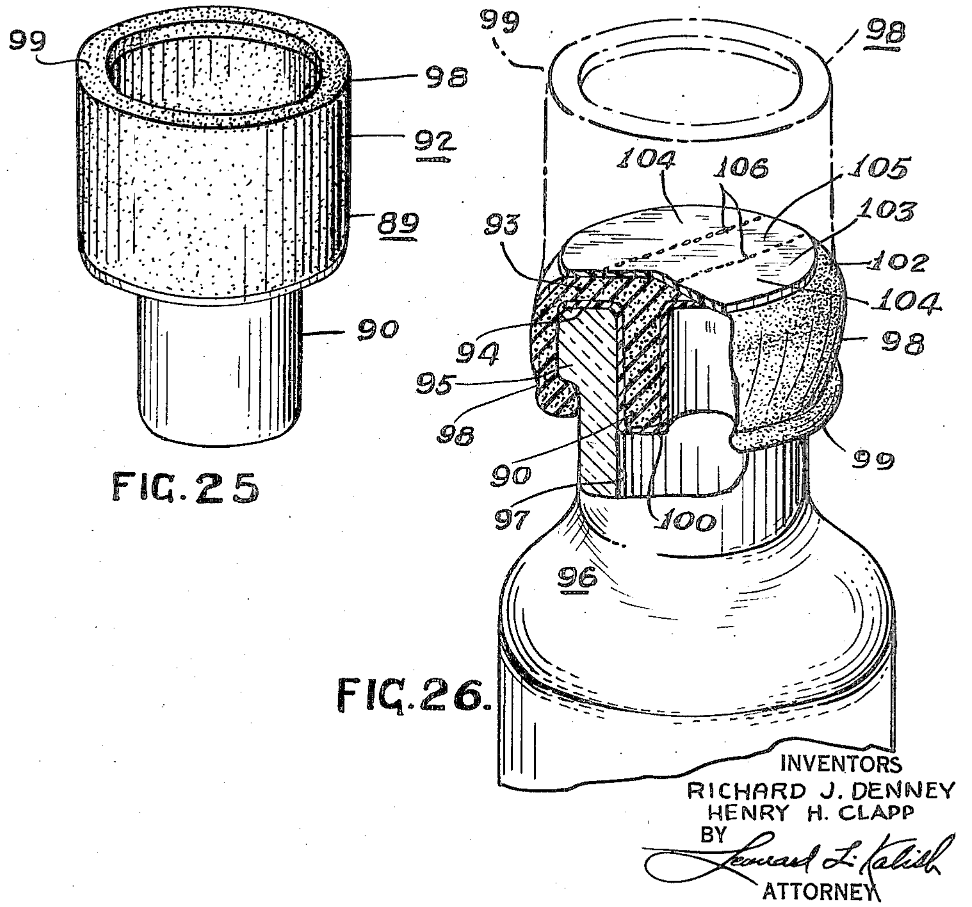
Figure 25 represents a perspective view showing an individual stopper of Figure 24.
Figure 26 represents a fragmentary perspective view, partly in section, showing an individual stopper of Figure 25 positioned in place upon a bottle.

In Figures 25 and 26 there is shown a stopper 89 including a generally cylindrical body-portion 90 having a cylindrically-concave inner surface 91 and including an enlarged top 92 providing an annular downwardly-directed flange 93 constructed and arranged to seat against the upper annular surface 94 of the lip 95 of a bottle (or other similar container) 96, when the body-portion 90 is inserted within the mouth 97 of said bottle.

A relatively thin tubular resilient gripping-sleeve 98 is formed integrally with the top 92 and extends generally axially upwardly from the periphery thereof as indicated in Figure 25; the sleeve 98 being foldable downward upon itself to bring its annular free edge 99 below the top 92 in a manner to be described more fully hereinbelow.

A thin continuous film 100 of nylon (or other synthetic resin) is securely and continuously bonded to the soft rubber of the stopper; the film 100 covering the inner and outer surfaces of the body-portion 90 and also the flange 93 of the top 92; the film preventing chemical (or other) interaction between the soft rubber of the stopper and the contents of the bottle 96 such as might contaminate such contents or render them ineffective and/or harmful for medicinal purposes.

The stopper 89 is used by first inserting the body-portion 90 into the mouth 97 of the bottle 96 with the gripping-sleeve 98 extending upwardly therefrom as indicated in dash-dot lines in Figure 6. In this position, the cylindrical outer wall of the body-portion 90 makes continuous fluid-tight sealing contact with the inner wall of the mouth 97 while the flange 93 is seated against the upper surface 94 of the lip 95.

The upper free edge 99 of the gripping-sleeve 98 is then turned downwardly and outwardly so as to invert the sleeve upon itself and to cause the gripping-sleeve 98 to extend downward from the top 92, in enveloping relationship to the enlarged lip 95 of the bottle 96, with the annular free edge 99 firmly gripping the neck 101 of the bottle 96 somewhat below the lip 95, as indicated in solid lines in Figure 26. Since the diameter of the neck 101 is somewhat greater than the normal diameter of the gripping-sleeve 98, the latter is stretched somewhat when in its downwardly-extending gripping position as shown in solid lines in Figure 26. This results in a secure gripping action and maintains the stopper firmly in place within the mouth of the bottle; the frictional retaining force exerted by the sleeve upon the neck preventing accidental dislodgment of the stopper.

However, the free edge 99 can be readily rolled upward, manually, to return the sleeve 98 to its original upwardly-extending position to permit removal of the stopper (as, for example, in order to refill the empty bottle). The upper relatively flat circular surface 102 of the top 92 (i. e. the surface surrounded by the upwardly-extending gripping-sleeve 98) may, optionally, be provided with a relatively thin disc 103 of nylon (or other synthetic resin); the disc 103 being adhesively bonded to the surface 102 only along segment-shaped areas 104 with a diametrically-extending unbonded area 105 disposed therebetween.

When the gripping sleeve 98 is in its turned-down gripping position, the nylon disc 103 can be grasped at the free edge of its unbonded portion 105 and manually torn away to expose a clean sterile rubber surface for penetration by the hypodermic needle. If desired, parallel weakening lines 106 (of perforations) may be formed on the unbonded portion of the disc 103 to facilitate the tearing away thereof.

Figure 24:
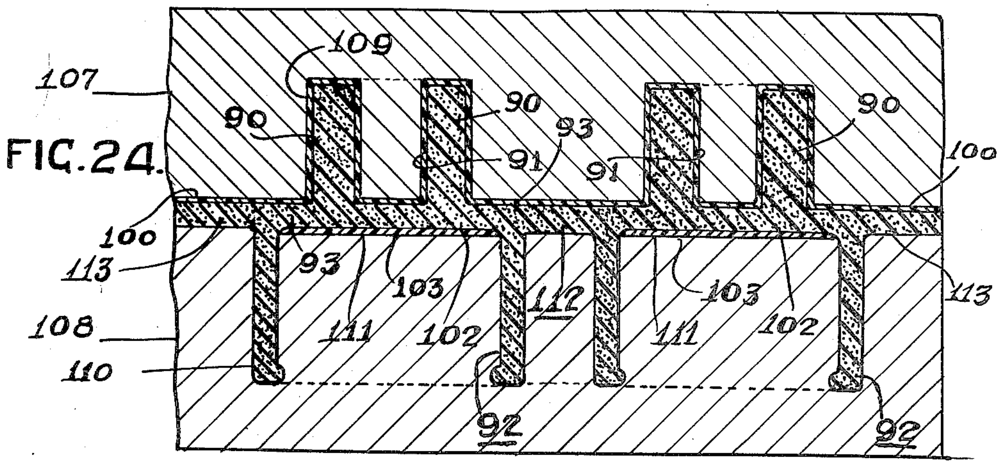
Figure 24 represents a cross-sectional view generally like that of Figure 2, but showing another embodiment of the invention.

A preliminary stage in the method of forming the stopper 89 is shown in Figure 24.

Thus, in Figure 24, there are shown upper and lower mold-sections 107 and 108 provided with aligned annular mold-sockets or concavities 109 and 110, respectively. The over-all diameter of the mold-sockets 109 is less than the over-all diameter of the mold-sockets 110 but the radial dimension or thickness of the annular concavities 109 is greater than that of the annular concavities 110.

The individual nylon discs 103 (which have previously been cut to size and coated with dried thermo-setting adhesive along the spaced segment-shaped areas 104) are positioned upon the upper circular walls of the knobs or tips 111 of the lower mold-sockets 110, with the adhesive-coated side of the disc uppermost. The rubber sheet and the upper continuous nylon film 100 (the under surface of which has previously been continuously coated with dried thermo-setting adhesive in a manner similar to that described hereinabove) are then positioned intermediate the mold-sections 107 and 108, which are then brought together; the heat and pressure of the mold causing the upper nylon film 100 and the rubber sheet to soften and flow into the configuration of the mold concavities in the manner indicated in Figure 24.

At the same time, the heat and pressure of the mold cause the thermo-setting adhesive to harden or set thereby creating a continuous bond between the upper nylon film 100 and the juxtaposed surfaces of the molded strip 112 and also creating a bond between the adhesive-coated areas 104 of the individual nylon discs 103 and the juxtaposed rubber surfaces of the strip 112.

The mold is then cooled and opened and the strip 112 removed therefrom, whereupon the individual stoppers 89 are cut from the strip 112 by trimming off the webbing or flashing 113 around the periphery of the top 92.

Any conventional stamping device (as, for example, one employing multiple annular cutting dies of a diameter enabling them to fit snugly around the sleeves 98) can be employed for this cutting operation.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. A method of forming a needle-penetrable stopper for a container which includes the steps of fully coating one face of a thin flexible but relatively non-resilient film of thermoplastic synthetic resin with a thermosetting adhesive, partially coating one face of a second thin flexible but relatively non-resilient film of thermoplastic synthetic resin with thermosetting adhesive, positioning said films on either face of a somewhat thicker sheet of thermoplastic resilient soft elastomer with the coated faces facing inwardly, and subjecting said films and said sheet to molding temperature and pressure thereby to form them into the desired stopper configuration and at the same time to cause the adhesive to set so as to create a secure bond between the resin films and the juxtaposed molded elastomer surfaces, with the uncoated portion of the second film providing an unbonded removable portion of such film in the final stopper.

2. A method according to claim 1 wherein the first mentioned resin film is generally coextensive with the elastomer sheet and wherein a strip having a plurality of stopper-portions connected by relatively thin webbing is first formed, using a multi-cavity mold, the first-mentioned resin film forming a continuously-bonded imperforate coating on one face of the strip, and wherein a plurality of relatively small individual pieces of synthetic resin film are provided on the other face of the elastomer sheet, said individual pieces being adhesively-coated only along spaced areas thereof with an intervening uncoated area whereby said individual pieces are bonded to the strip only at the stopper-portions thereof with the intervening uncoated areas unbonded, and wherein the individual stoppers are subsequently formed by trimming away the webbing of the strip around the periphery of each stopper-portion.

3. A method according to claim 1 wherein the first mentioned resin film is generally coextensive with the elastomer sheet and wherein a strip having a plurality of stopper-portions connected by relatively thin webbing is first formed, using a multi-cavity mold, the first-mentioned resin film forming a continuously-bonded imperforate coating on one face of the strip, and wherein the second synthetic resin film is also generally coextensive with the elastomer sheet, said second film having relatively small uncoated areas extending in alignment with the stopper-portions, and wherein the individual stoppers are subsequently formed by trimming away the webbing of the strip around the periphery of each stopper-portion, whereby the first-mentioned resin film forms a continuously-bonded covering on one face of the stopper while the second-mentioned resin film forms a partially-bonded covering on the other face of the stopper with the unbonded portion detachable from the stopper.

4. A method of forming a needle-penetrable stopper for a container which includes the steps of fully coating one face of a thin film of nylon with a thermosetting adhesive, partially coating one face of a second thin film of nylon with thermosetting adhesive, positioning said films on either face of a somewhat thicker sheet of rubber with the coated faces facing inwardly, and subjecting said films and said sheet to molding pressure thereby to form them into the desired stopper configuration and at the same time to cause the adhesive to set so as to create a secure bond between the nylon films and the juxtaposed molded rubber faces, with the uncoated portion of the second film providing an unbonded removable portion of such film in the final stopper.

5. A method according to claim 4 wherein the first-mentioned nylon film is generally co-extensive with the rubber sheet and wherein a strip having a plurality of stopper-portions connected by relatively thin webbing is first formed, using a multi-cavity mold, the first-mentioned film forming a continuously bonded imperforate coating on one face of the strip, and wherein a plurality of relatively small discrete individual pieces are provided on the other face of the rubber sheet, said individual pieces being adhesively-coated only along spaced areas thereof with an intervening uncoated area whereby said individual pieces are bonded to the strip only at the stopper-portions thereof with the intervening uncoated areas unbonded, and wherein the individual stoppers are subsequently formed by trimming away the webbing of the strip around the periphery of each stopper-portion.

6. A method according to claim 4 wherein the first-mentioned nylon film is generally co-extensive with the rubber sheet and wherein a strip having a plurality of stopper-portions connected by relatively thin webbing is first formed, using a multi-cavity mold, the first-mentioned nylon film forming a continuously bonded imperforate coating on one face of the strip, and wherein the second nylon film is also generally co-extensive with the rubber sheet, said second nylon film having relatively small uncoated areas extending in alignment with the stopper-portions, and wherein the individual stoppers are subsequently formed by trimming away the webbing of the strip around the periphery of each stopper-portion, whereby the first-mentioned nylon film forms a continuously bonded covering on one face of the stopper while the second-mentioned nylon film forms a partially bonded covering on the other face of the stopper with the unbonded portion detachable from the stopper.

References Cited in the file of this patent

UNITED STATES PATENTS

| Number | Name | Date |
|---|---|---|
| 1,482,045 | Stearns | Jan. 29, 1924 |
| 2,227,212 | Beck | Dec. 31, 1940 |
| 2,449,180 | Schroeder | Sept. 14, 1948 |
| 2,497,454 | Illingworth et al. | Feb. 14, 1950 |
| 2,499,724 | Compton | Mar. 7, 1950 |

FOREIGN PATENTS

| Number | Country | Date |
|---|---|---|
| 423,856 | Great Britain | Feb. 5, 1935 |